United States Patent [19]

Skibowski

[11] Patent Number: 5,400,456
[45] Date of Patent: Mar. 28, 1995

[54] PIPELINE SCRAPER

[75] Inventor: Hubert Skibowski, Hamburg, Germany

[73] Assignee: I.S.Y. Molchtechnik GmbH, Hamburg, Germany

[21] Appl. No.: 909,603

[22] Filed: Jul. 7, 1992

Related U.S. Application Data

[62] Division of Ser. No. 539,584, Jun. 18, 1990, Pat. No. 5,127,125.

[30] Foreign Application Priority Data

Jun. 27, 1989 [DE] Germany ............... 39 20 981.4
Apr. 10, 1990 [EP] European Pat. Off. ........... 90106907

[51] Int. Cl.⁶ ................................ B08B 9/04
[52] U.S. Cl. ................................ 15/104.061
[58] Field of Search ............ 15/104.061, 3.5, 3.51, 15/104.062, 104.063; 134/8; 166/70, 153, 170, 177; 137/268

[56] References Cited

U.S. PATENT DOCUMENTS

| | | |
|---|---|---|
| 1,756,378 | 4/1930 | Oberhuber . |
| 2,188,959 | 2/1940 | Schaer . |
| 2,763,017 | 10/1956 | Redin . |
| 3,340,889 | 9/1967 | Petzold . |
| 3,704,478 | 12/1972 | Vernooy . |
| 3,906,576 | 10/1975 | Knapp et al. . |
| 4,083,074 | 4/1978 | Curtis . |
| 4,279,266 | 7/1981 | Knox et al. . |
| 4,356,865 | 11/1982 | Appel et al. ............ 15/104.061 |
| 4,603,449 | 8/1986 | Knapp . |
| 4,937,907 | 7/1990 | Antal . |
| 4,984,322 | 1/1991 | Cho et al. . |
| 5,035,021 | 7/1991 | Le Devehat . |

FOREIGN PATENT DOCUMENTS

| | | |
|---|---|---|
| 300602 | 1/1990 | European Pat. Off. . |
| 375532 | 6/1990 | European Pat. Off. . |
| 2227491 | 12/1974 | France . |
| 1994891 U | 10/1968 | Germany . |
| 2237346 | 2/1972 | Germany . |
| 2260589 | 6/1973 | Germany . |
| 2801378 | 7/1979 | Germany . |
| 3032532 | 3/1982 | Germany . |
| 3506621 | 8/1986 | Germany ............ 15/104.061 |
| 1554894 | 6/1949 | United Kingdom . |
| 905007 | 12/1959 | United Kingdom . |
| 1378831 | 12/1974 | United Kingdom . |
| 1397542 | 6/1975 | United Kingdom . |
| 1423132 | 1/1976 | United Kingdom . |
| PCT/US88/-01549 | 5/1988 | WIPO . |

Primary Examiner—Edward L. Roberts
Attorney, Agent, or Firm—Vidas, Arrett & Steinkraus

[57] ABSTRACT

A pipeline scraper comprising an elongated scraper body of preferably elastomeric solid material, having at least one annular sealing surface on both sides of a section having a smaller diameter, the distance between the sealing surfaces being equal to or smaller than the internal diameter of the pipeline, whereby on both sides of the section having a smaller diameter, at least one annular ridge-like, radial lip is provided which has a height which is at most a fifth to a tenth of the radius of the scraper body in the area of the sealing lip, with the distance of the scraper body from the pipeline in the area of the sealing lip corresponding to the 0.5- to 0.75- fold of the height of the lip and the sealing lip being formed and dimensioned such that upon getting into contact with the pipeline wall it is deflected and bent-off, respectively, such that the associated edge and the lateral face of the sealing lip get into contact with the pipeline wall, however, still leave a space to the scraper body.

11 Claims, 6 Drawing Sheets

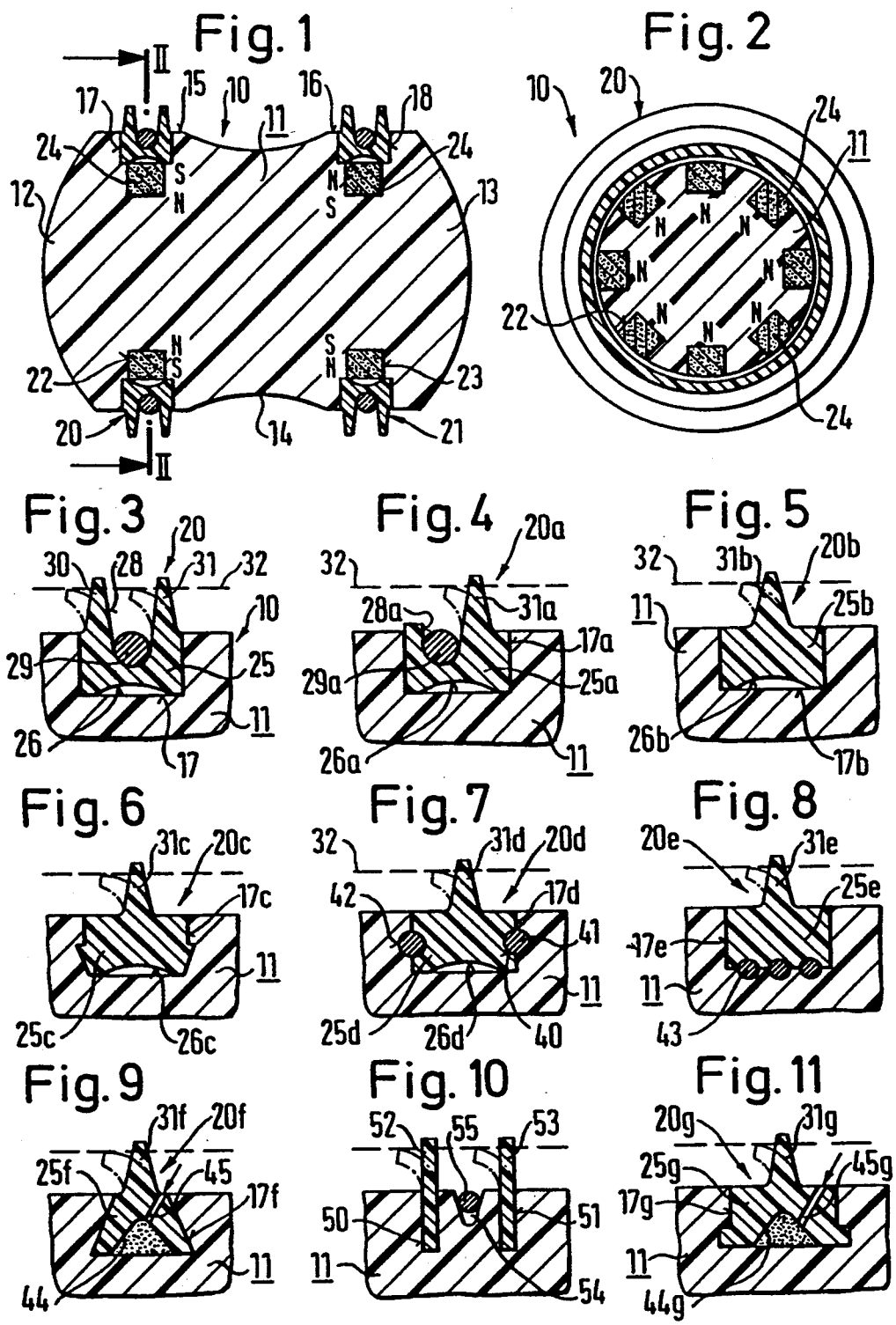

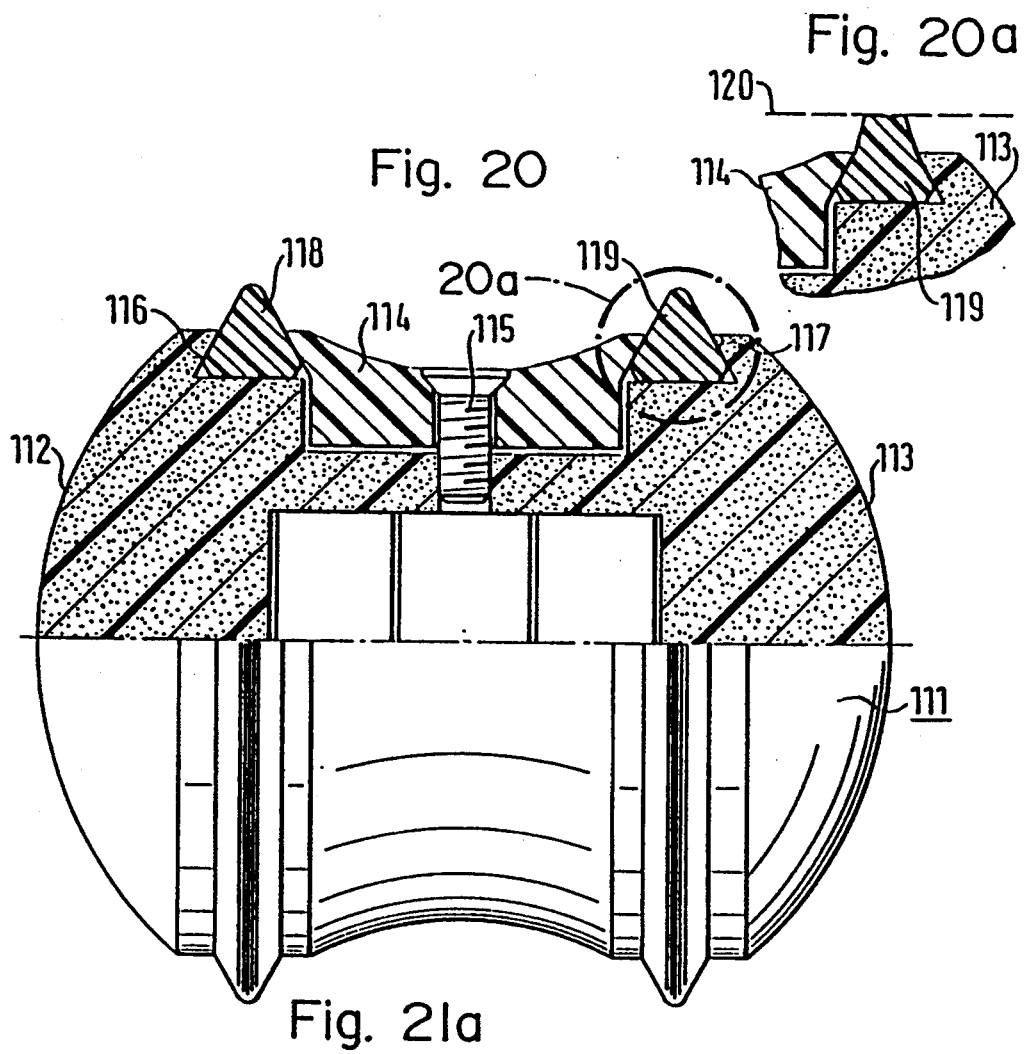
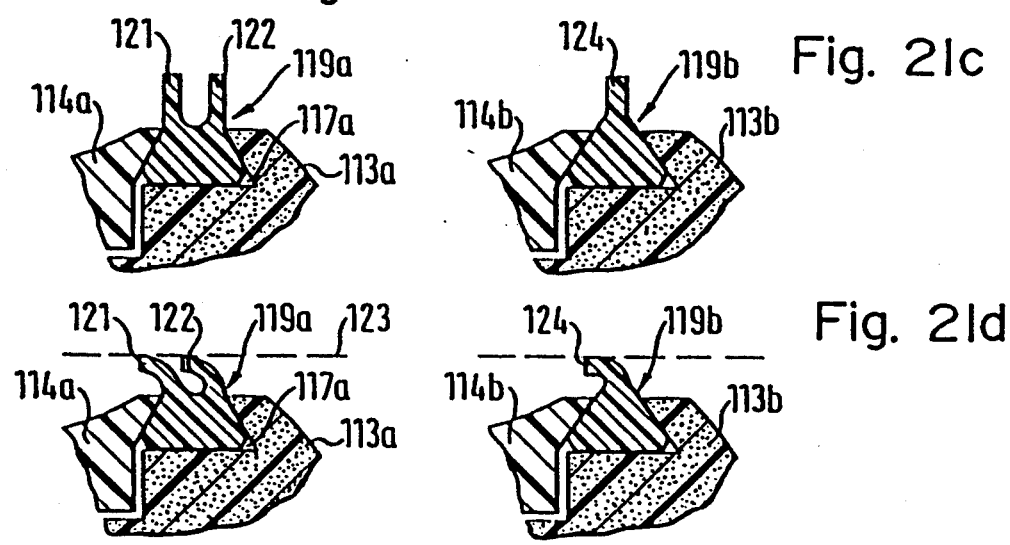

PIPELINE SCRAPER

This application is a division of application, Ser. No. 07/539,584, filed Jun. 18, 1990, now U.S. Pat. No. 5,127,125.

The invention relates to a pipeline scraper.

From DE-PS 28 01 378, a pipeline scraper is known with a sealing device fixed on each of the end surfaces of a longitudinal scraper body. The sealing device consists of plane, cylindrical discs with a guiding disc located in front, a sealing disc and a supporting disc located behind the sealing disc, with the guiding disc and the supporting disc being made of a harder elastic material than that of the sealing disc froming the sealing section.

Such a scraper, normally of a metal structure, is not suitable for a two-way operation which is a frequently occurring mode of application without specific arrangements.

From DE-PS 30 32 532, a pipeline scraper is known with annularly cylindrical, axially spaced sealing surfaces formed on the scraper body which has a contraction of area between the sealing surfaces. With the aid of such a scraper body, pipelines can be run through in both directions also in narrow bends without the risk of a stoppage. However, one disadvantage is that the complete scraper has to be thrown away if the sealing surfaces are useless due to wear or damage. A special peculiarity of the known pipeline scraper exists also therein that the seal developing the scraping effect is formed of the same elastomer, solid material as the integral scraper body. Pipelines being scraped have frequently variations of the diameter and unevenesses which originate from the welds and flanged couplings. Therefore, the alternative is often only either to design the scraper body with a high initial tension thus having heavy running properties, and to demand small line tolerances or to design a scraper body which has easy running properties and to tolerate a reduced scraping and sealing effect, respectively.

The object of the invention is to provide a two-way pipe-line scraper with easy running properties, which permits a good adaptation to pipe tolerances, and nevertheless has a good scraping effect.

This object is attained by the invention.

With the pipeline scraper according to the invention, the scraping effect results from shortly spaced, annularly surrounding, radial lips. The lips are relatively short with respect to the radius of the scraper body. Moreover, they are shaped and dimensioned such that they are relatively strongly deflected about to one half of their heights upon contact with the pipe wall. Therefore, the scraping effect does not take place with the outer circumference of the sealing lip but with each one of an outer edge and the associated lateral face of the sealing lip. The dimensions of the sealing lip are further such that it is not squeezed upon getting into contact with the pipe wall, i.e. upon bending the sealing lip should not engage the scraper body and should also not be compressed instead of a lateral deflection of the sealing lip.

The radial height of the sealing lip is at most a fifth to a tenth of the radius of the scraper body. Preferably, the height of the sealing lip is even still below this amount.

An embodiment according to the invention provides that the radial sealing lip is located at an axial distance from an integrally formed, annular sealing and/or guiding surface placed axially further outside, the diameter thereof nearly corresponding to the diameter of the pipeline and the distance between the sealing lip and the sealing and/or guiding surface being at least large enough that upon deflection the sealing lip fails to come into contact with the annular sealing and/or guiding surface.

In combination with an axially spaced sealing lip, the annular sealing and/or guiding surface has substantially only guiding properties and prevents thus that the sealing lip is extremely stressed.

The design of a pipeline scraper according to the invention has a plurality of advantages. The elastic deflection of the lip by the pipeline wall produces a centering force so that the pipeline scraper is centrically guided in the pipeline. Upon a deviation from the central position, a peripheral area of the lip is progressively deformed by which an increasing elastic force is provided urging back the scraper in its central position. With an annular sealing and/or guiding surface, the centering effect is substantially effected by this surface.

Due to a quick and high elastic force of the lip on the pipeline wall, a remarkable scraping effect is obtained with grooves, slots and the like being also wiped off. The scraping effect gets automatically regulated in dependence of the differential pressure, i.e. with a higher differential pressure, the scraping effect is also higher. On the other hand, the required driving pressure is substantially lower than with known scrapers due to the relatively small contact area of the lip with the pipe wall. Therefore, it can be operated with lower driving pressures. This leads to a saving of valuable power gas and simultaneously to a saving of time upon pressure release processes.

Further, it has turned out that the life time of the scraper according to the invention is significantly longer than with the known scrapers. Moreover, the scraper according to the invention has excellent qualities in dry operation.

The position of the scraper according to the invention, in a terminal is stable because the lips have to be turned over upon a reversal of the running direction. For that, an enlarged initial pressure is in fact necessary with respect to the normal driving pressure but the higher pressure can be provided without great expense. The stable end position of the scraper is important because subpressures can be caused by turbulences or other events attempting to pull out the scraper of its terminal.

The pipeline scraper according to the invention also has substantially a solid scraper body preferably of an elastomeric material. The lip can be formed integrally on the scraper body. The size of the scraper body is dimensioned such that the distance of the sealing lip is equal to or smaller than the internal diameter of the pipeline. Optionally, plastic material can also be used.

According to an embodiment of the invention, the scraper body has at least one annular groove in each of the end areas wherein separate annular sealing elements are located. The annular sealing elements are detachably mounted so that they can be taken out and substituted after wear, damage etc. Alternatively, the sealing elements are embedded into the material of the scraper body during production. In this case, however, they are not exchangeable.

The annular sealing elements preferably consist of a suitable elastomeric material, however, the annular sealing elements can also consist of a weakly elastic or non-elastic material, for instance of PTFE, if this is necessary for specific aggressive agents. In this case, a spring element accommodated in a groove of the sealing element or embedded into the material of the sealing element, can provide the necessary spring effect for the sealing element.

According to an embodiment of the invention, the annular grooves for the accommodation of the sealing elements can be rectangular in cross section.. Alternatively, the annular grooves can have an undercut to hold the sealing ring securely.

The sealing elements can be sticked into the annular grooves, however, they are detachable. Alternatively, annular fasteners can be used to attach the sealing element to scraper body securely. Finally, the sealing rings can securely be attached to the scraper body by vulcanization or by injected and cured epoxies tester.

The annular sealing elements can be formed as integral rings or they can be formed of stranded material. For this purpose, a steel band, preferably of a non-magnetic steel can be fixed on the inner side of the sealing element, for instance by an adhesive or by vulcanization. Alternatively, only sealing discs can be used located in the groove of the sealing body. The sealing discs are securely fixed to the scraper body by a securing element under tension and accommodated between two ring discs.

In some cases, it is desirable that driving agent flows along the scraper. For that, at least one radial recess in the sealing element can be provided or alternatively, a brush-like sealing element can be used.

A cylindrical permanent magnet can be centrically located in the scraper body. On the other hand, in another embodiment according to the invention, at least one permanent magnet is located in a recess in the bottom of the annular groove accommodating the sealing element. A plurality of permanent magnets spaced in the circumferencial direction has the advantage that the magnets can be easily fixed.

Example embodiments of the invention are explained in detail in the following along accompanying drawings.

FIG. 1 is a longitudinal section through a pipeline scraper according to the invention.

FIG. 2 is a cross section through the illustration of FIG. 1 along line 2—2.

FIGS. 3 to 19 show different embodiments for sealing elements of a pipeline scraper according to the invention.

FIG. 20 shows an alternative embodiment of a pipeline scraper according to the invention, partly in a longitudinal section FIG. 20a is a detail view of the portion of FIG. 20 encircled by broken line 20a as it appears within a pipeline.

FIGS. 21a–d show alternative embodiments for a sealing element of a pipeline scraper according to FIG. 20.

Figure 22:
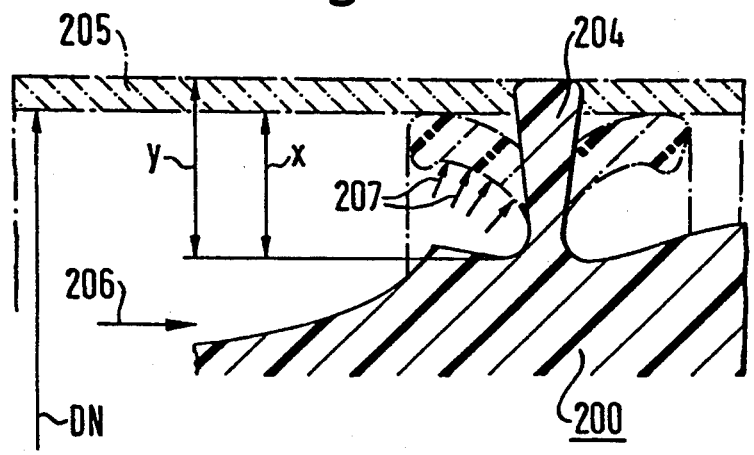

FIG. 22 shows a portion of a pipeline scraper according to the invention, with a scraping lip being in the neutral position as well as in the deflected position.

Figure 23:
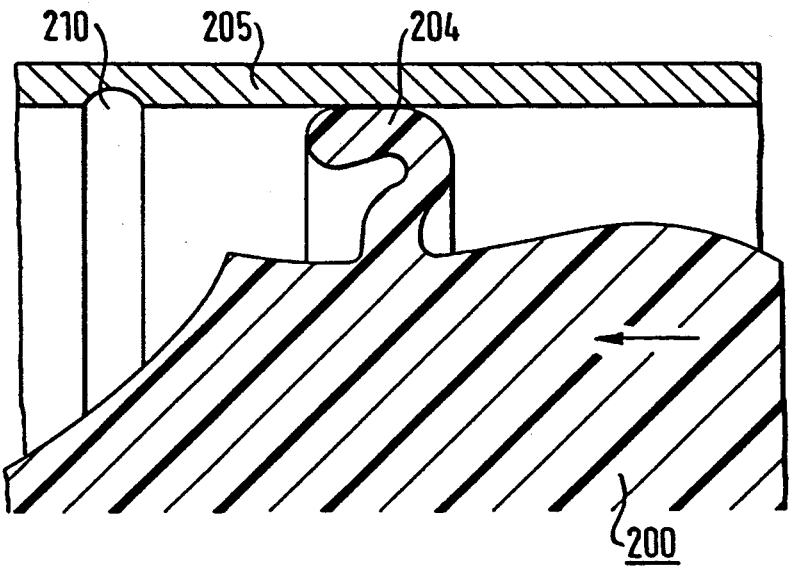

FIG. 23 shows a similar illustration as FIG. 22, however, at the moment of turning over the scraping lip.

Figure 24:
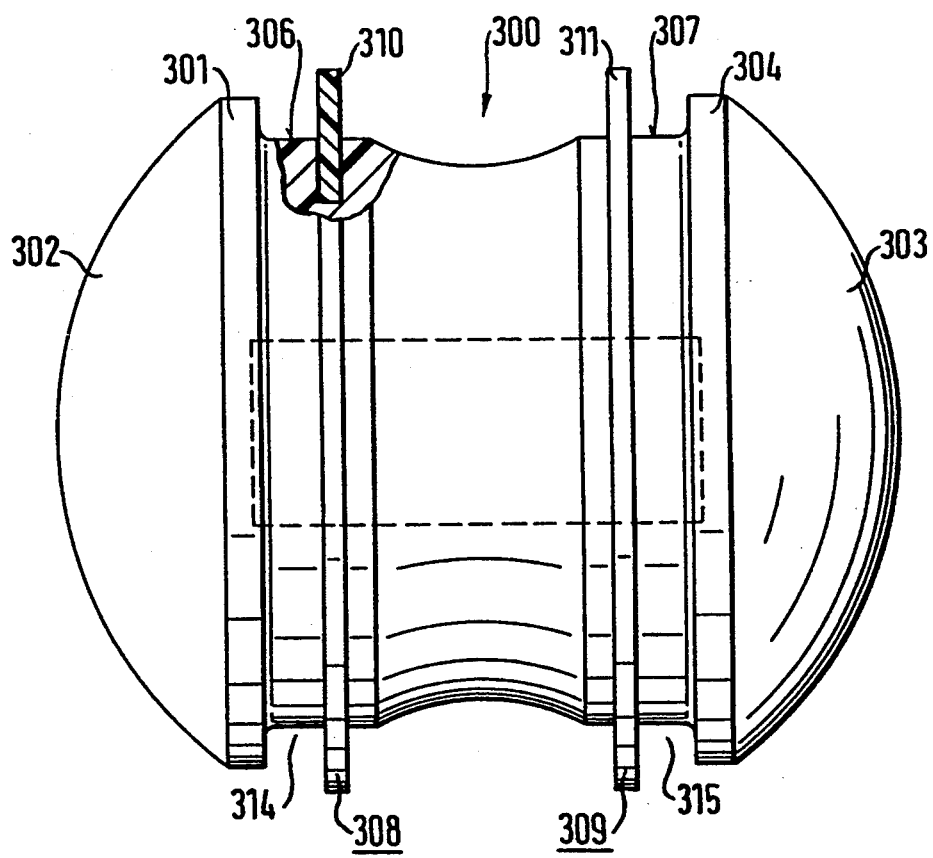

FIG. 24 shows a further embodiment of a pipeline scraper according to the invention.

In FIGS. 1 and 2, a pipeline scraper 10 is demonstrated having an integral scraper body 11 of elastomeric material. With its configuration, the scraper body substantially corresponds to the pipeline scraper according to DE-PS 30 32 532. The scraper body has two specularly located, coaxial spherical elements 12, 13 and a central contraction of area 14. The smallest diameter of the contraction of area 14 is selected such that smallest bends can be run through without wall contact of the scraper body 11. For instance, the smallest diameter can be insignificantly smaller than a diameter still guaranteeing a running through of smallest bends without wall contact. Cylindrical sections 15, 16 are between contraction of area 14 and spherical sections 12, 13. Into the cylindrical sections 15, 16, annular grooves 17, 18 are formed rectangular in cross section. The center distance of the annular grooves 17, 18 is generally smaller for instance than the inner diameter of the pipeline to be sraped. In the annular grooves 17, 18, annular sealing elements 20, 21 are placed, the structures thereof are described in detail in the following according to FIG. 3. In the annular grooves, circumferentially spaced recesses 22, 23 are also formed which accommodate permanent magnets 24 or other detectable materials. The permanent magnets 24 below sealing element 20 are oriented such that the north pole lies radially inside whereas the situation is inverse with the other permanent magnets. Therefore, inside and outside of the scraper body 11, the magnetic field lines are directed from one row of permanent magnets to the other. The magnetic field is used to exite a detector located in the pipeline wall which accordingly indicates the presence of a scraper and its running through the pipeline, respectively.

As demonstrated in FIG. 3 in particular, the sealing elements 20, 21 have a supporting section 25 fitted to the cross section of groove 17, with a slight groove on the inner side thereof. On the radially outer side, the supporting section 25 has an annular groove 28 into which a circular annular fastener element 29 is inserted, for instance a plastic or steel band, a braid of steel or plastic material etc. The object of the fastener is to hold the annular sealing element 20 radially in the groove 17. On both sides of the groove, two axially spaced, radial sealing lips 30, 31 are formed. They are trapezoidal in cross section and taper radially outwards. Optionally, they can also taper radially inwards or the sides thereof are parallel. Upon their contact with the pipeline wall which is demonstrated by dashed line 32, the sealing lips 30, 31 are nearly deflected about 90°. Since the sealing elements 20, 21 consist of elastomeric material, the scraper 10 can be driven in both directions, with the sealing lips 30, 31 being turned over upon a change of direction to allow a feed into the new direction.

In FIGS. 4 to 19, modifications of the annular grooves and the sealing elements, respectively, for the scraper body 11 are demonstrated. They are specified with the same reference numerals as in FIGS. 1 to 3, however, a letter is added. The scraper body remains the same and has the reference numeral 11 therefore.

A sealing element 20a is accommodated by an annular groove 17a rectangular in cross section or slightly conical, having a supporting section 25a similar to that in FIG. 3, however, only one sealing lip 31a is formed which in its outline is like the sealing lip 30 and 31, respectively, according to FIG. 3.

An annular fastener 29a similar to that in FIG. 3 is accommodated by an annular groove 28a. As indicated dash-dotted, the sealing lip 31a is deflected and bent-off, respectively, in a similar way as the sealing lips 30, 31a.

In the sealing element 20b according to FIG. 5, the section for accommodation 25b is substantially rectangular, however, has a slight groove 26b on the inner side. In the center of the section for accommodation 25b, a single sealing lip 31b trapezoidal in cross section is formed which gets into contact with pipeline wall 32 by deflection.

The sealing element 20b is adhered into the groove 17b, for instance.

The sealing element 20c looks like sealing element 20b, however, the inner surface of the section for accommodation 25c has an outline like a dove-tail in cross section, with the groove 17c being formed correspondingly. Therefore, the sealing element 20c is accommodated with undercut in the groove 17c, and is securely retained therein.

In the embodiment according to FIG. 7, the sealing element 20d is again like the sealing element according to FIG. 5 and FIG. 6, respectively. On the front sides, the supporting section 25d has, however, annular grooves 40, each one shaped semi-circular in cross section, which accommodate annular fasteners 41 which are inserted into annular grooves 42 semi-circular in cross section, in the walls of annular groove 17d. By that, the sealing element 20d is also effectively anchored in annular groove 17d.

The annular sealing element 20e according to FIG. 8 is extensively looking like that of FIG. 5. Before fixing the sealing element 20e in the annular groove 17e, three electrically conductive wires 43 are placed adjacent to and axially spaced from each other, a current being generated in the wires by electric induction, for instance, by which the wires 43 are vulcanized into the elastomeric material of the sealing element 20e and the scraper body 11, respectively. The tight attachment of the wire prevents a pulling up of sealing element 20e.

In the embodiment according to FIG. 9, a groove 17f trapezoidal in cross section is provided tapering radially outwards. The supporting section 25f of sealing element 20f is correspondingly shaped. The sealing lip 31f is like the sealing lip 31e of the embodiment according to FIG. 8. The sealing element 20f is also securely held in the groove 17f by the undercut on the inner side. The sealing element 20f has an annular recess 44 communicating with an area of sealing element 20f outside of scraper body 11 by a bore 45. Through the bore 45, plastic material, liquid epoxy resin, for instance, can be injected which afterwards cures in the recess 44 and therefore produces an intimate attachment of the section of accommodation 45f within the groove 17f.

In the embodiment according to FIG. 11, the accommodated section 25g is stepwisely in cross section, with the larger width being placed further radially inwards so that the accommodated section 25g is positively secured due to its shape in the correspondingly shaped groove 17g. Similar to the embodiment according to FIG. 9, an annular recess 44g is shaped which is communicating with an area of sealing element 20g outside of the scraper body 11 by a bore 45g for the purpose of injecting adhering plastic material.

In the embodiment according to FIG. 10, a double-arrangement of sealing elements is used instead of a single sealing element in an end region of scraper body 11. Ring discs 52, 53 are located into two adjacent, relatively narrow annular grooves 50, 51 of scraper body 11. Between the annular grooves 50, 51, an annular groove 54 triangular in cross section is formed in the scraper body 11 by which a fastener 55 is accommodated under radial tension. The fastener 55 presses the material of the scraper body 11 laterally and thus is clamping the ring discs 52, 53.

Figure 12:
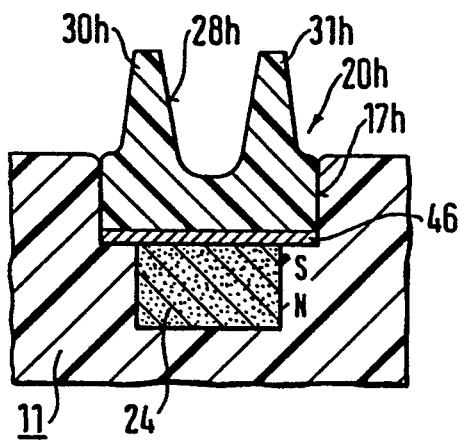

The sealing element 20h according to FIG. 12 is like sealing element 20 according to FIG. 3 so that the structure is not further described. Additionally, a steel band 46 is fixed on the inner side of the sealing element, for instance it is sticked and vulcanized, respectively, to the sealing element 20h. The initial form of the sealing element 20h consists of stranded material cut to the appropriate length. In the groove, the ends of this section are abuttedly connected, with the steel band 46 being also abuttedly or overlappingly connected.

Figure 13:
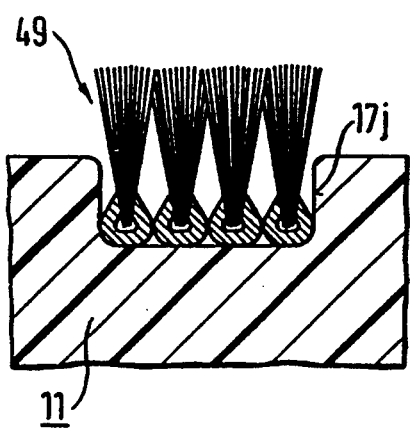

In the embodiment according to FIG. 13, a ring-shaped arrangement of brushes 50 is accommodated in a groove 17j rectangular in cross section. The arrangement of brushes 50 can also be provided as stranded material which is connected at the ends in the groove 17j in an appropriate manner.

The outline in cross section of the sealing element 20k according to FIG. 14 is again like that according to FIG. 12 or that according to FIG. 3. Therefore, the structure is not further described. The difference to the mentioned embodiments is that the material is PTFE, thereby having a non-elastic or only a weakly elastic behaviour. Therefore, a spring element 51 U-shaped in cross section is inserted in the groove 28k fixed by a securing element 52 in the groove 28k. The sealing lips 30k and 31k obtain elastic conditions through the legs of spring element 51 when each of the sealing lips are deflected in direction towards the other.

Figure 15:
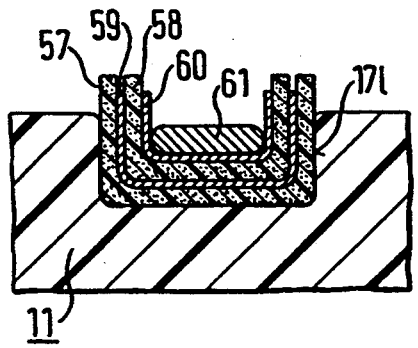
Figure 16:
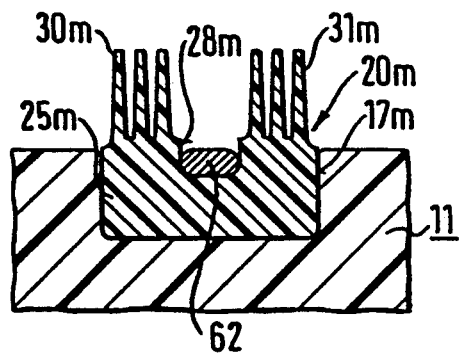

In the embodiment according to FIG. 15 two sealing rings U-shaped in cross section are accommodated in groove 171 with the free ends of the legs are projecting beyond the outer circumference of scraper body 11. The sealing elements 57, 58 are again formed of PTFE. For that, a spring element 59 U-shaped in cross section is located between the sealing elements 57, 58. Inside sealing element 58, a spring element 60 U-shaped in cross section is also accommodated. The whole arrangement is held together and fixed in groove 171 by a flat strip 61 co-acting with the web of a spring element 60. As it is to be seen, the spring elements 59, 60 give the normally non-elastic sealing elements 57, 58 a yielding condition.

The annular sealing element 20m according to FIG. 11 has a accommodated section which is like the embodiment according to FIG. 3, for instance. Instead of two sealing lips 30, 31 as shown in FIG. 3, two arrangements of three sealing lips 30m and 31m, respectively, are provided, with the sealing lips 30m, 31m being relatively thin and therefore being flexible. An annular fastener 62 is again accommodated in the annular groove 28m of the accommodated section 25m.

Figure 17:
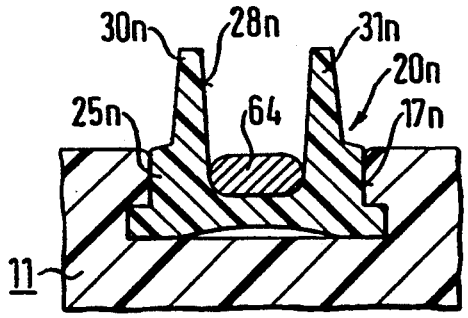

The structure of sealing element 20n according to FIG. 17 is more or less like the structure of the sealing element according to FIG. 11 but without the possibility of pasting it as is along with FIG. 11. The sealing lips 30n, 31n are like those of FIG. 3, for instance. In the slightly broader groove 28n, a flat fastener 64 is placed holding the sealing element 20n in groove 17n. The band or the ring 64 is made of metal. Therefore, it can replace the permanent magnet 24 in that the not-shown detector located in the pipeline wall responds to metal.

Figure 14:
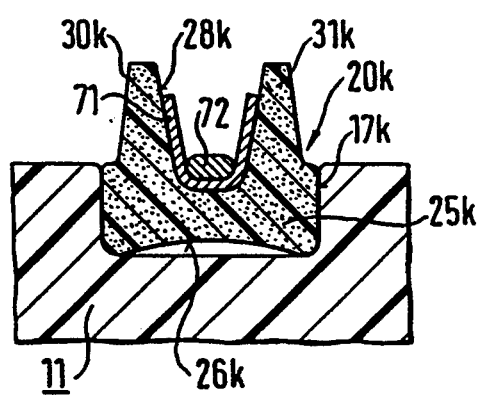
Figure 18:
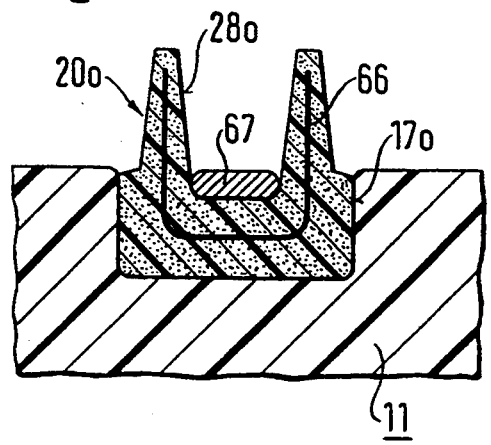

The outline in cross section of the sealing element 20o according to FIG. 18 is more or less like that according to FIG. 3 or FIG. 12 and FIG. 14, respectively. The structure of the sealing element is not further described, therefore. In contrast to these embodiments, a U-shaped spring element 66 is embedded into the sealing element 20o. The sealing element 20o consists of PTFE so that the spring element 66 gives this a sufficient elastic condition. A fastener ring 67 is accommodated in groove 28o.

Figure 19A:
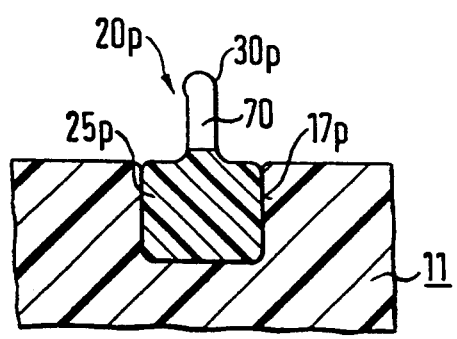
Figure 19B:
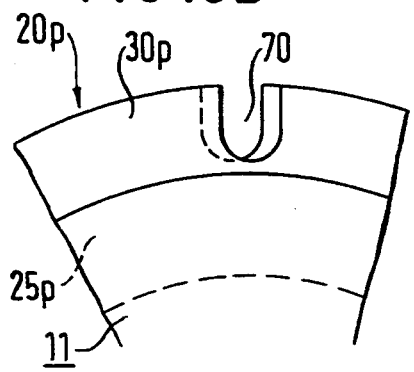
Figure 19C:
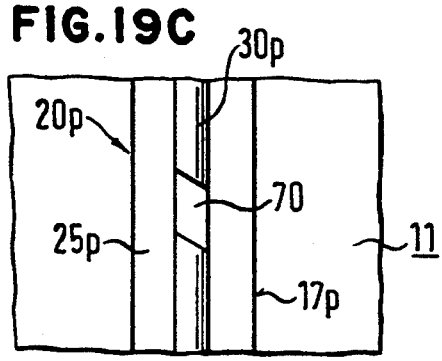

The structure of the sealing element 20p shown in FIG. 19 is like the structure of sealing element 20b of FIG. 5. Common details are not described, therefore. However, one speciality has to be noticed, in that the sealing lip 30p has an oblique throughgoing passage 70 in axial direction. This allows that driving gas can flow along the sealing lip 30p to drive forward a scraper located downstream in driving direction. It is clear that a plurality of such passages 70 can be located at circumferential distances.

In the embodiment according to FIG. 20 and 21, the scraper body 111 consists of plastic material, for instance of PTFE. Its outline corresponds to that of scraper body 11 according to FIG. 1. However, it consists of three sections that is two end sections 112, 113 providing the spherical section of scraper body 111 and a section with a smaller outer diameter on the inner side whereby an annular groove stepwise in cross section is provided if the portions 112, 113 are coaxially located. Between the sections 112, 113, an annular section 114 is placed which is adapted to be connected with the sections 112, 113 by at least one screw 115. With the mentioned portions 112, 113 and 114, grooves 116 and 117, respectively, trapezoidal in cross section are provided on the end surfaces of scraper body 111, with the shape of the grooves nearly corresponding to that of the embodiment according to FIG. 9. In the grooves 116, 117 correspondingly shaped, triangular sealing elements 118, 119 are located which can consist of elastomeric material or also of PTFE. As is to be seen in FIG. 20a, the material of the sealing elements is pressed together by the pipeline wall marked by a broken line so that a cylindrical sealing surface is provided.

In the embodiment according to FIGS. 21a–d, two alternative embodiments are demonstrated for the sealing section of the sealing elements. In FIG. 21a, the sealing element 119a has a section for accommodation which is like that of sealing element 119 according to FIG. 20. The sealing section consists of two disc-like sealing lips 121, 122, the distance thereof being selected such that the sealing lips 121, 122 do not touch each other upon getting into contact with pipeline wall 123 which is marked by a broken line in FIG. 21b.

In FIG. 21c, the sealing element 119b has only a single sealing lip 124 similar to the sealing lips 31c, 31d or 31e in the embodiments according to the FIGS. 6, 7 or 8. The deflection of sealing lip 124 is demonstrated in FIG. 21d.

In the embodiments according to FIGS. 22 and 23, a scraper body 200 of solid material is indicated with which a sealing lip 204 trapezoidal in cross section is integrally formed. The sealing lip 204 tapers radially from outside to inside, however. A pipeline wall is demonstrated at 205. The radial height of sealing lip 204 is indicated by a Y which is reduced to the amount of X if the sealing lip is relatively strong deflected by getting into contact with the pipe wall 205.

When the scraper 200 is driven forwards by driving agent in direction of the arrow 206, the pressure of the power gas als acts against the sealing lip 204 and presses this according to the arrows 207 against the pipeline wall 205 so that the pressure of sealing lip 204 against the pipeline wall 205 depends on the pressure difference across the sealing lip 204. When the pipeline scraper 200 is driven in the opposite direction, the sealing lip has a position as is shown on the right hand side of the stress-relieved sealing lip 204.

FIG. 23 shows the position of the sealing lip 204 at the moment of overturning when for instance the pipeline scraper 201 is driven first into the direction of arrow 206 and afterwards driven into the opposite direction. The final complete deflection is guaranteed by annular grooves or the like as shown at 210.

In FIG. 24, an integral scraper body 300 consisting of elastomeric solid material is shown similar to the scraper body 10 according to FIG. 1. It has spherical cup-shaped end sections 302, 303, the radius thereof being equal to or a little larger than the half length of scraper body 300. Cylindrical sealing and/or guiding surfaces 301, 304 are formed in contact with the sections 302, 303. The diameter of these surfaces nearly correspond to the internal diameter of the pipeline to be scraped. If the material of scraper body 100 is relatively elastic, the diameter of the sealing and/or guiding surfaces 301, 304 can be a little larger than the internal diameter of the pipeline. If the material of the scraper body is relatively hard, however, the diameter of the sealing and/or guiding surfaces is selected equal to or smaller than the internal diameter of the pipeline. The distance between the annular surfaces 301, 304 is equal to or lower than the diameter of the pipeline.

In contact to the surfaces 301, 304, a cylindrical surface 306, 307 is formed, the diameter thereof is significantly smaller than that of surfaces 301 and 304. Disc-shaped sealing elements 308, 309 are located in the cylindrical sections 306, 307. They can be located in adequate grooves of sections 306, 307 and can be fixed by an adhesive, for instance. However, they can also be embedded into the material of scraper body 300, for instance during moulding of scraper body 300. The sealing elements 308, 309 provide sealing lips 310, 311 which project beyond the cylindrical sections 306, 307. The height of sealing lips 310, 311 is selected such as in the above mentioned embodiments. The height is about the 1.5-fold to the double of the distance of the pipeline wall from the cylindrical sections 306 and 307, respectively (preferably 1.6-fold). Thereby, the sealing lips are deflected, as described, upon getting into contact with the pipeline wall so that a sealing effect is realized by the associated edge and the side surfaces of the sealing lips 310, 211.

Between the sealing surfaces 301, 304 and the sealing lips, a space for accommodation 314, 315 for the sealing lip being deflected is provided, with the distance and the width, respectively, of the space 314, 315 is selected such that it can completely accommodate the sealing lip 310, 311 without sealing lips 310, 311 contacting adjacent portions of scraper body 300.

The sealing elements 308, 309 can be produced of the same material as the scraper body 301 or of a different material. In any case, a flat material can be used as basic material which makes the production particularly easy.

I claim:

1. A pipeline scraper for insertion into a pipeline of predetermined diameter comprising:
an elongated generally cylindrical scraper body of solid material having a pair of first portions of a first diameter less than said pipeline diameter, said first portions being located on either side of a second central portion having a relatively smaller diameter, at least one laterally bendable annular ridge-like radial sealing lip extending radially outwardly from each of said first body portions, and a pair of third body portions spaced on either side of said central second portion axially further outwards than said first portions, each said third portion having an integrally formed annular sealing/guiding surface the diameter of which nearly corresponds to the diameter of said pipeline, the distance between each said sealing/guiding surface and the nearest said sealing lip being at least such that when laterally bent said sealing lip fails to contact said annular sealing/guiding surface, and the height of said sealing lips from said first body portions being between 1.5 and 2 times the difference between the radius of the pipeline and the radius of said first body portions.

2. The pipeline scraper according to claim 1, characterized in that a ring-shaped space for the accommodation of said laterally bent sealing lip is provided between said annular sealing/guiding surface and said sealing lip.

3. The pipeline scraper according to claim 1, characterized in that said scraper body is cylindrical in the area adjacent said sealing lip.

4. The pipeline scraper according to claim 1 characterized in that said sealing lip is integrally formed with said scraper body.

5. The pipeline scraper according to claim 4, characterized in that said scraper body consists of an elastomeric, relatively hard material.

6. The pipeline scraper according claim 1, characterized in that said sealing lip is formed on a separate, annular sealing element which is located in an annular groove of said scraper body.

7. The pipeline scraper according to claim 6, characterized in that said sealing element is detachably located in said annular groove.

8. The pipeline scraper according claim 7, characterized in that said annular sealing element is embedded into the material of said scraper body during production.

9. The pipeline scraper according to claim 6, characterized in that said annular sealing element consists of elastomeric material.

10. The pipeline scraper according to claim 6, characterized in that said sealing elements are formed as ring discs.

11. The pipeline scraper according to claim 6, characterized in that said annular grooves are rectangular in cross section.

* * * * *